United States Patent
Croxford (10) Patent No.: US 7,565,516 B2
(45) Date of Patent: Jul. 21, 2009

(54) WORD REORDERING UPON BUS SIZE RESIZING TO REDUCE HAMMING DISTANCE

(75) Inventor: Daren Croxford, Burwell (GB)

(73) Assignee: ARM Limited, Cambridge (GB)

(*) Notice: Subject to any disclaimer, the term of this patent is extended or adjusted under 35 U.S.C. 154(b) by 249 days.

(21) Appl. No.: 11/363,270

(22) Filed: Feb. 28, 2006

(65) Prior Publication Data

US 2007/0226387 A1 Sep. 27, 2007

(51) Int. Cl.
*G06F 15/00* (2006.01)
*G06F 7/00* (2006.01)

(52) U.S. Cl. .............. 712/300; 707/5; 707/6; 713/300; 714/746

(58) Field of Classification Search .......... 712/300
See application file for complete search history.

(56) References Cited

U.S. PATENT DOCUMENTS

| | | | |
|---|---|---|---|
| 5,574,921 A * | 11/1996 | Curran | 713/320 |
| 6,583,735 B2 * | 6/2003 | Henkel et al. | 341/51 |
| 2001/0011356 A1 * | 8/2001 | Lee et al. | 713/322 |
| 2006/0026413 A1 * | 2/2006 | Ramkumar | 712/300 |
| 2007/0005922 A1 * | 1/2007 | Swaminathan et al. | 711/167 |

OTHER PUBLICATIONS

Childers et al., *Reordering Memory Bus Transactions for Reduced Power Consumption*, ACM SIGPLAN Workshop on Languages, Compilers, and Tools for Embedded Systems, PLDI'2000, Jun. 2000, 9 pages.

Yang et al., *Frequent Value Encoding for Low Power Data Buses*, ACM Transactions on Design Automation of Electronic Systems, vol. 9, No. 3, Jul. 2004, pp. 354-384.

* cited by examiner

*Primary Examiner*—Eddie P Chan
*Assistant Examiner*—William B Partridge
(74) *Attorney, Agent, or Firm*—Nixon & Vanderhye P.C.

(57) ABSTRACT

In a system having a first device 10 and a second device 8 between which data values are transferred via an N-bit bus, a resizing unit 18 and an M-bit bus, reordering of the data is performed such that portions of the original N-bit data words having a high degree of bit-value correlation are grouped together as successive transfers thereby reducing the Hamming distance between successive transfers in a manner that reduces energy consumption.

39 Claims, 5 Drawing Sheets

WORD REORDERING UPON BUS SIZE RESIZING TO REDUCE HAMMING DISTANCE

FIELD OF THE INVENTION

This invention relates to the field of data processing systems. More particularly, this invention relates to reordering data words to be transmitted upon resizing so as to reduce Hamming distances between successive words and thereby reduce energy consumption.

BACKGROUND

It is known from "Frequent Value Encoding For Low Power Data Buses" Jun Yang et al, ACM (Association for Computing Machinery) Transactions on Design Automation of Electronic Systems, Volume 9, No. 3, July 2004, Pages 354 to 384 to encode data values to be transmitted to reduce switching activity on external buses for the purpose of reducing power consumption. However, this technique has the disadvantage that extra circuit resources and power are consumed by first encoding the data values to be transmitted and then subsequently decoding these values. This reduces the benefit achieved. Furthermore, the increased gate count represents a cost and complexity overhead which is disadvantageous. In addition, the requirement for changes in both the sender of the data and the receiver of the data has practical difficulties when those entities might be provided by different sources and, for example, changes within the receiver may not be readily made so as to provide appropriate decoding. Also, a separate decoder with its own bus drivers consumes significant power.

It is known from "Reordering Memory Bus Transactions For Reduced Power Consumption" Bruce R. Childers et al. ACM SIGPLAN Workshop On Languages, Compilers, and Tools for Embedded Systems, during ACM SIGPLAN Conference On Programming Language Design and Implementation (PLDI' 2000, June 2000) to examine with hardware the data words within a cache line being transferred to or from memory so as to determine a different order for the data words to be transferred in order to reduce switching activity and accordingly energy consumption. This approach of examining the individual data words to be transmitted so as to calculate a new order of transmission which reduces the Hamming distances between elements has the disadvantage of requiring a considerable amount of special purpose hardware so that it can be achieved sufficiently rapidly. This additional hardware consumes power which detracts from the energy saved by reducing the switching activity on the buses. The additional hardware is also a disadvantageous complexity and cost overhead.

It will be appreciated from the above that there is a desire to reduce the power consumption associated with the switching of signal lines when transmitting data over a data bus. These signal lines, particularly when they are off-chip such as between an integrated circuit and an associated separate memory integrated circuit (IC), have a relatively high capacitance and so soak up a disadvantageous amount of energy to drive from one signal level to another signal level at high speed. In a typical present day system driving the memory bus for an off-chip memory subsystem might consume 15 to 30% of the overall system power consumption. Measures which can reduce this power consumption, and yet not introduce their own unacceptable disadvantages, are strongly advantageous.

SUMMARY

Viewed from one aspect the present invention provides apparatus for processing data, said apparatus comprising:
a first device;
an N-bit data bus coupled to said first device and operable to transmit N-bit bus transactions;
a second device;
an M-bit data bus coupled to said second device and operable to transmit M-bit bus transactions, where M is less than N;
bus resizing logic coupled to said N-bit data bus and to said M-bit data bus and operable to convert between an N-bit bus transaction upon said N-bit data bus and a plurality of M-bit bus transactions upon said M-bit data bus; and
transmission reordering logic operable to reorder data within a sequence of N-bit data words being transmitted between said first device and said second device via said N-bit data bus, said bus resizing logic and said M-bit data bus, such that bit-value correlated portions of different N-bit data words are transferred using a common portion of temporally adjacent M-bit data words being transmitted via said M-bit data bus thereby reducing an average Hamming distance between successive M-bit data words transmitted via said M-bit data bus.

The invention recognises that for a significant proportion of data words being transmitted on a bus which is at least as large as the data element size for that bus, then there is a statistical correlation between bit values for individual signal lines over successive data words transmitted. As an example, if 32-bit integer data values are being transmitted over a 32-bit data bus, then since many data values are typically low compared to the total range of values possible, then they will include a large number of leading zeros or leading ones depending upon the sign representation. When successive such integer values are transmitted over the same data bus, then the signal lines associated with these bit values which are bit-value correlated between successive data words will not change and accordingly will not soak up energy in being driven to different signal levels. The present technique recognises that whilst this serendipitous situation arises when the data elements being transferred are the same size or narrower than the bus across which they are being sent, this is not the case when the data bus width is reduced so as to be less than the size of the data elements. Such bus width reduction is common in many systems, e.g. a system-on-chip design may operate with internal 32-bit buses transmitting 32-bit words, but use a 16-bit memory bus off-chip to communicate with, for example, a SDRAM (synchronous dynamic random access memory). When such bus resizing is performed and a data word is split into successively transmitted half words, then the bit-value correlation between portions of the data words transmitted is lost since successive data words transmitted over the narrower data bus will be taken from different parts of the original data word. As well as recognising this phenomena, the present technique provides the solution of reordering the data words to be transmitted on the narrower data bus so as to preserve the bit-value correlation between successive data words (at least to a statistically advantageous extent) in a manner that reduces the Hamming distance between successive data words transmitted and accordingly reduces energy consumption. As an example, if two successive 32-bit integer data values are to be transmitted over a 16-bit memory bus, then the present technique would reorder the words to be transmitted such that the high order portions of the two integer values would be sent adjacent one another since these would be the portions of the original 32-bit values likely to show high bit-value correlation and thus reducing Hamming distance therebetween. Whilst it will be appreciated that in its most general sense the bit-value correlation between N-bit data words may not be between the same portions of those N-bit data words and yet if it was regular, such correlation could be exploited by an appropriate re-ordering of the resultant N-bit data words, but in practice the more common and readily exploitable situation is where temporally adjacent N-bit data words to be transmitted each have at least one portion which is bit-value correlated between those temporally adjacent N-bit data words and the transmission reordering logic reorders the data within the N-bit data words such that at least the portion having the bit-value correlation is transmitted using a common portion of temporally adjacent M-bit data words.

The present technique works particularly well when the wider data bus is a whole number multiple of the narrower data bus in width and that multiple of bit-value correlated M-bit portions of different N-bit data words are transmitted via the narrower bus as temporally adjacent M-bit data words. Thus, for example, if the wider data bus was 64-bits and the narrower data bus was 16-bits, then it would be advantageous to transmit the highest portions of four adjacent 64-bit data words together as adjacent 16-bit data words on the narrower bus since these portions would be likely to show a good degree of bit-value correlation. The same groupings could, if desired, be used with the three remaining lower order portions of the 64-bit data words.

It will be appreciated that the transmission reordering logic could be located at various points within the design, but particularly suitable points are as part of the bus resizing logic or as part of the first device.

Whilst the present technique can be used with a variety of second devices, it is particularly useful when the second device is a memory since memories are often associated with high capacitance data buses which are prone to high power consumption.

In the context of the second device being a memory, it is advantageous to provide the bus resizing logic and the transmission reordering logic as part of a memory controller associated with that memory.

It will be appreciated that when the data from the original N-bit data words is reordered successive transactions on the narrower bus will relate to different data words compared to the original N-bit data bus and accordingly have different address values associated with them. These different address values will be non-adjacent even when the original data words on the N-bit bus were sequential with adjacent addresses and accordingly the transmission reordering logic may be required to perform a mapping between the original addresses and the new addresses.

The above address mapping can occur both when writing from the wide bus to the narrow bus and when reading from the narrow bus to the wide bus, at which stage the mapping will need to be reversed.

In the case of storing to memory, and in some other circumstances, the recipient of the reordered data may not need to be made aware of the address reordering since providing that the data is returned in that same order so that the remapping can be appropriately reversed, then there will be no overall net change. In this circumstance, the data is effectively stored in a scrambled order within the target device, e.g. a memory.

The size of the data elements being transferred, whether they are the same size as the N-bit bus, or narrower than the N-bit bus, is significant in determining what reordering to apply. This size may be communicated from the first device to the second device or may be configured within the second device and communicated back to the first device when the first device is responsible for the reordering. Various combinations of where such data is stored and where it is communicated are possible. It is important that the transmission reordering logic is able to be responsive to the data element size in order to apply the appropriate reordering.

The data element size, and thus the nature of the reordering applied, may in some embodiments be associated with a memory address range to which the data is being written or from which the data is being read. Thus, a certain portion of the address space may be associated with 32-bit data values, another portion with 16-bit data values and so forth.

Whilst the present technique has an advantage when used purely for on-chip buses by reducing the energy consumed in switching those buses, the technique is particularly useful when being used for a bus which passes off-chip.

The technique is also particularly useful in systems which support burst mode transfers since these are ones where streams of data words from successive memory addresses which are likely to show high degrees of bit value correlation are transferred together.

Viewed from another aspect the present invention provides apparatus for processing data, said apparatus comprising:

first device means;

an N-bit data bus coupled to said first device means and operable to transmit N-bit bus transactions;

second device means;

an M-bit data bus coupled to said second device and operable to transmit M-bit bus transactions, where M is less than N;

bus resizing means coupled to said N-bit data bus and to said M-bit data bus and for converting between an N-bit bus transaction upon said N-bit data bus and a plurality of M-bit bus transactions upon said M-bit data bus; and transmission reordering logic for reordering data within a sequence of N-bit data words being transmitted between said first device means and said second device means via said N-bit data bus, said bus resizing means and said M-bit data bus, such that bit-value correlated portions of different N-bit data words are transferred using a common portion of temporally adjacent M-bit data words being transmitted via said M-bit data bus thereby reducing an average Hamming distance between successive M-bit data words transmitted via said M-bit data bus.

Viewed from a further aspect the present invention provides a method of processing data, said method comprising the steps of:

transmitting N-bit bus transactions via an N-bit data bus coupled to a first device;

transmitting M-bit bus transactions via an M-bit data bus coupled to a second device, where M is less than N;

converting between an N-bit bus transaction upon said N-bit data bus and a plurality of M-bit bus transactions upon said M-bit data bus; and reordering data within a sequence of N-bit data words being transmitted between said first device and said second device via said N-bit data bus and said M-bit data bus, such that bit-value correlated portions of different N-bit data words are transferred using a common portion of temporally adjacent M-bit data words being transmitted via said M-bit data bus thereby reducing an average Hamming distance between successive M-bit data words transmitted via said M-bit data bus.

The above, and other objects, features and advantages of this invention will be apparent from the following detailed description of illustrative embodiments which is to be read in connection with the accompanying drawings.

BRIEF DESCRIPTION OF THE DRAWINGS

Embodiments of the invention will now be described, by way of example only, with reference to the accompanying drawings in which.

DETAILED DESCRIPTION

Figure 1:
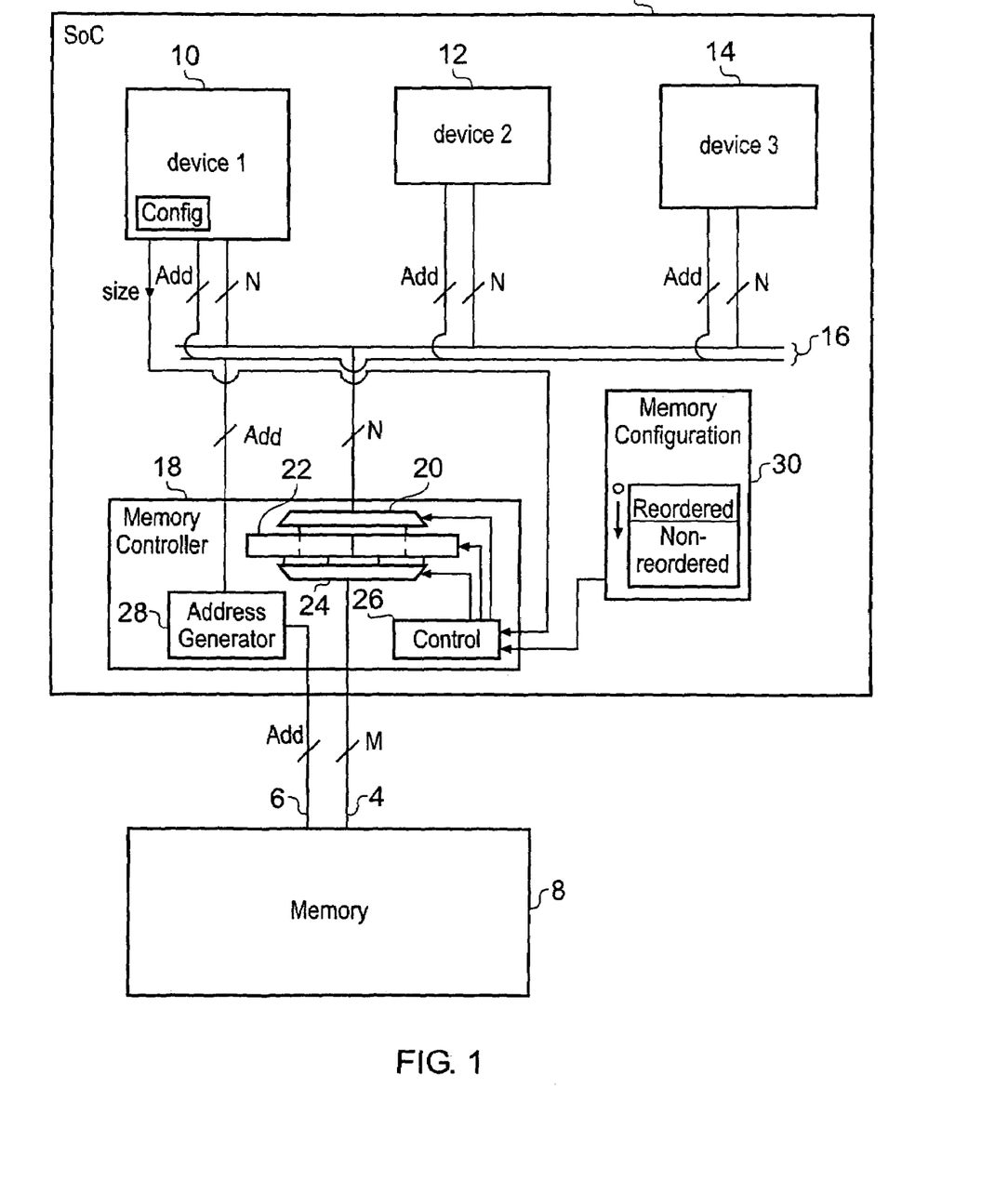
FIG. 1 schematically illustrates a system-on-chip integrated circuit communicating via a memory bus with an off-chip memory integrated circuit.

FIG. 1 illustrates a system-on-chip integrated circuit 2 connected via a memory bus, having an M-bit data bus portion 4 and an address bus portion 6, to an off-chip integrated circuit memory 8, such as an SDRAM, a flash memory, an SRAM (static random access memory) etc. The integrated circuit 2 includes a first device 10, a second device 12 and a third device 14 all communicating via a common bus 16 which includes an N-bit data bus portion and an address bus portion. Also coupled to the common bus 16 is a memory controller 18. When the first device 10 wishes to write data to the memory 8, or read data from the memory 8, then this activity is performed via the memory controller 18.

The memory controller 18, as well as other conventional elements and functions, performs the tasks of resizing the data words to be transmitted from N-bits down to M-bits as well as reordering the data. Data words from the N-bit bus are received at a multiplexer 20 and stored within respective sides of a buffer 22 which has a capacity of 2N bits. Thus, the buffer 22 can be considered to form a swing buffer arrangement with successive data words from the N-bit data bus being written into respective halves of the buffer 22. A multiplexer 24 then reads M-bit portions of the data stored within the buffer 22 and drives these out on the M-bits data bus 4. The multiplexers 20 and 24 are switched by a controller 26. It will be appreciated that by appropriately selecting the M-bit portion to be read out from the buffer 22, the order of the data being driven out on the M-bit bus 4 can be changed such that bit-value correlated portions of the original N-bit data words are be driven out on successive cycles of the M-bit bus thereby reducing the Hamming distance between those successive M-bit data words. As an example, when two N-bit data words have been written into the buffer 22, the high order M-bit portions of those data words can be read out upon successive cycles of the M-bit bus 4 and driven to the memory 8. The address values on the address bus 6 sent out to the memory 8 are chosen to properly reflect the original addresses associated with the N-bit data words and thus will be non-sequential due to the reordering performed. Alternatively, the data can be stored in a scrambled form with the memory 8 by sticking with an original address sequence, for example a supported wrapping or linear addressing scheme, and ensuring that the reverse reordering is performed by the multiplexers 24, 20 and the buffer 22 when reading data from the memory 8. An address generator 28 is provided within the memory controller 18 to generate the re-sequenced addresses when such resequenced addresses are being used.

A memory configuration controller 30 is provided in which data is held defining memory address space regions storing data elements of different inherent size. Thus, certain memory address regions may be indicated as storing N-bit data values where it would be appropriate to perform reordering so as to reduce energy consumption when these are stored out to the memory 8, whereas other memory address space regions may be indicated as storing M-bit values in which case such reordering would normally be less worthwhile. The configuration of the memory in this way may be setup by writing to control registers within a configuration coprocessor or elsewhere within the integrated circuit 2.

Figure 2:
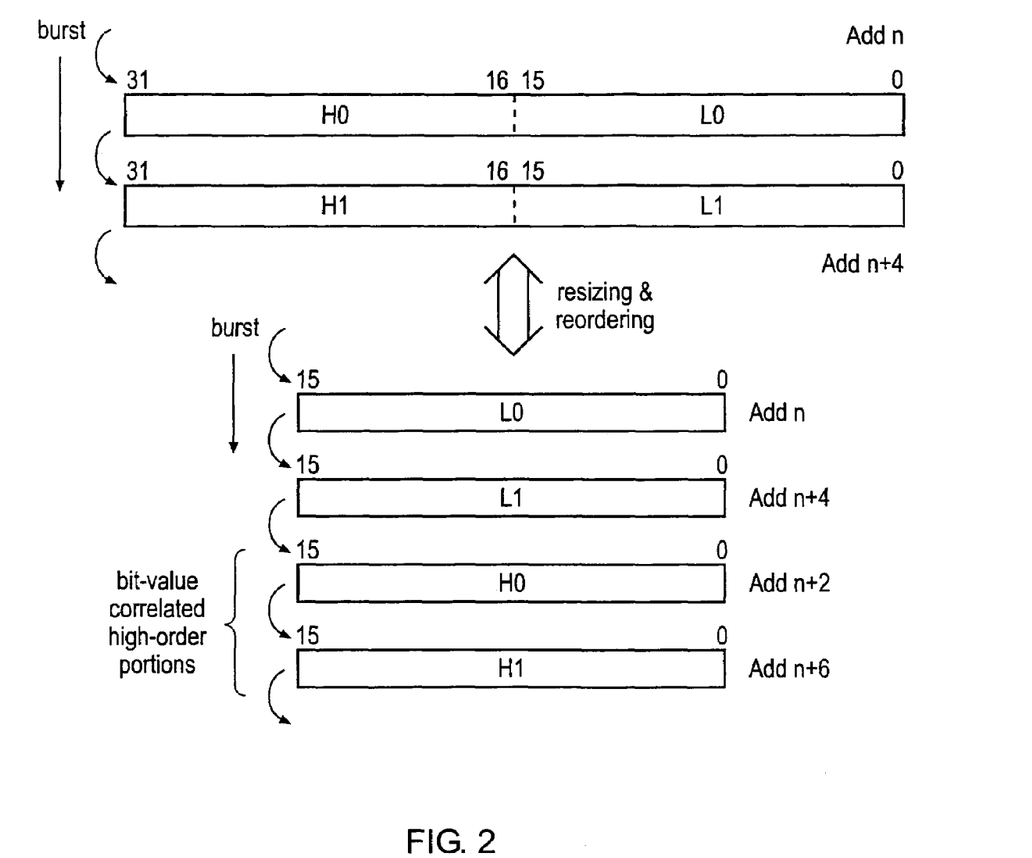
FIG. 2 schematically illustrates the reordering of data from two 32-bit data words into four 16-bit data words.

FIG. 2 schematically illustrates how two 32-bit data words may be resized and reordered into four 16-bit data words. Each of the original 32-bit data words has an associated address Add as well as having respective high and low 16-bit portions H and L. In this example, it is assumed that the high order portions H are the ones demonstrating most bit-value correlation, but it may be that both portions demonstrate such correlation, or in other circumstances the low order portions only. In order to exploit this bit-value correlation, as will be seen in FIG. 2, the sequence of 16-bit data words generated for transmission on the 16-bit bus is such that the low order bit portions from the original 32-bit data words are transmitted first followed by the high order 16-bit portions. The addresses transmitted with those 16-bit data words to the memory 8 are the true addresses of the portions concerned in the original memory map of the system-on-chip integrated circuit 2 and accordingly are non-sequential. As a consequence of the bit-value correlation between the high order portions H0 and H1 as illustrated, these two 16-bit data values will statistically tend to have a lower Hamming distance therebetween and accordingly consume less power when successively driven out upon the data bus to the memory 8.

Figure 3:
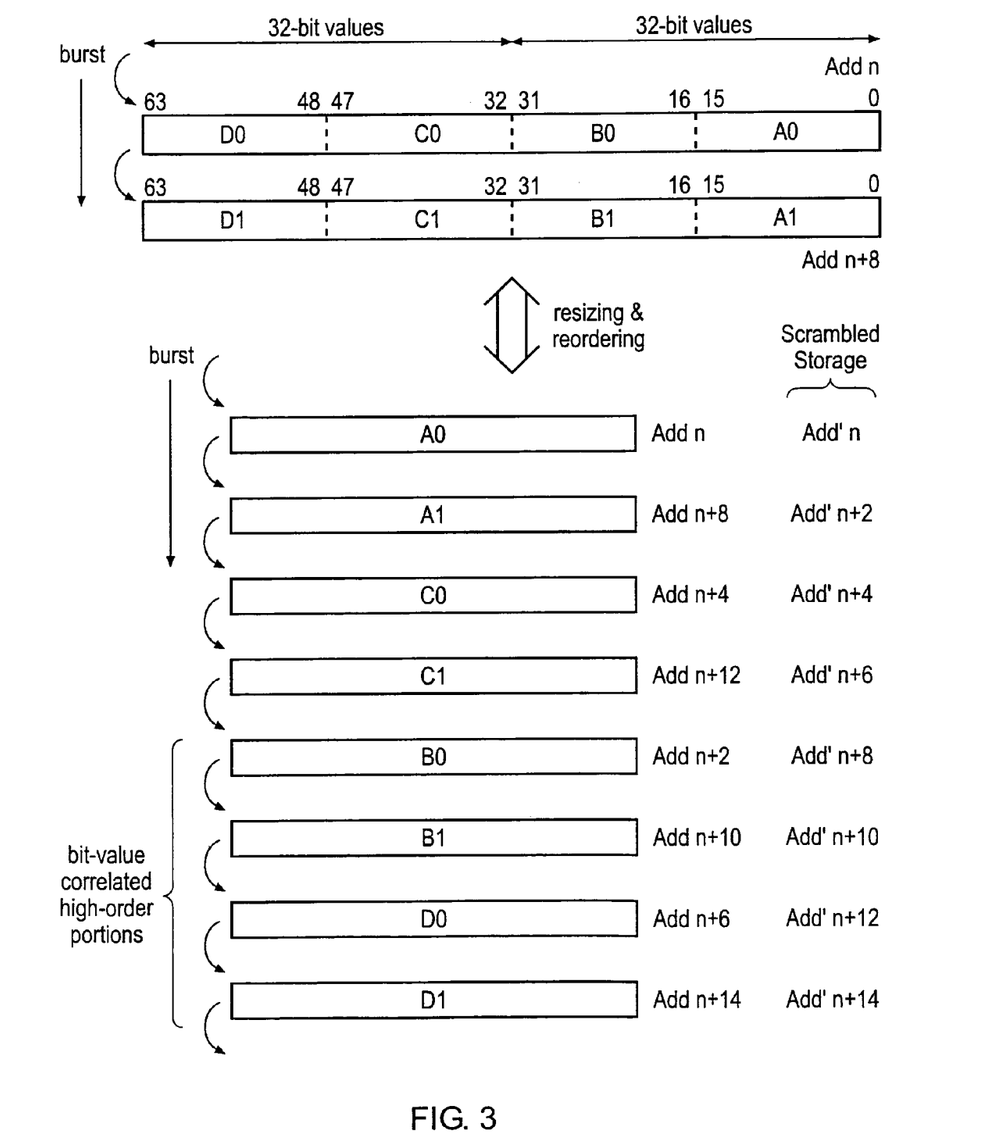
FIG. 3 schematically illustrates the reorder of data from two 64-bit data words into eight 16-bit data words.

FIG. 3 illustrates a further example in which two 64-bit data words each comprising two 32-bit data values are resized and re-ordered for driving out upon a 16-bit bus to a memory 8. In this case, the data element size on the wider 64-bit bus is different to the width of that bus itself and is half that width. Accordingly, when reordering the data from the 64-bit bus onto the 16-bit bus, it is the high order portions of the respective 32-bit data elements which should be grouped together to exploit the statistical correlation and accordingly reduce the Hamming distance. These high order portions are in the example of FIG. 3 the 16-bit portions B0, B1, D0 and D1 which are grouped together and sent as temporally adjacent (successive) 16-bit data words.

FIG. 3 illustrates immediately to the right of the 16-bit data words the original addresses in the original system-on-chip integrated circuit 2 view of the memory address space. The reordering results in non-sequential addresses being associated with the 16-bit data words and being driven out on the address bus 6 in some embodiments. It might be considered that the non-sequential nature of the address is being driven out would increase the Hamming distance between addresses on the address bus 6 in a way which counteracted the advantage of the invention. However, in practice the address values can be subject to significant Hamming distance changes when simply incrementing and in any case the correlation between data values tends to extend over a relatively larger number of bits in a manner which reduces power consumption overall despite any effect from non-sequential addresses.

To the right of the non-sequential addresses are illustrated an alternative sequence of sequential addresses which might be generated even if the data had been reordered. Such a sequence of sequential addresses would result in the data from the original 64-bit data words being stored in a scrambled order within the memory 8 compared to the view of that memory 8 and its address space as seen from the system-on-chip integrated circuit 2. However, providing that when the data is read back from the memory 8 the reordering is reversed in the same way, such a scrambling is transparent to the system-on-chip integrated circuit 2 and may be considered as no more than a remapping of the particular cells or banks of memory which happen to be storing particular bits of data.

Figure 4:
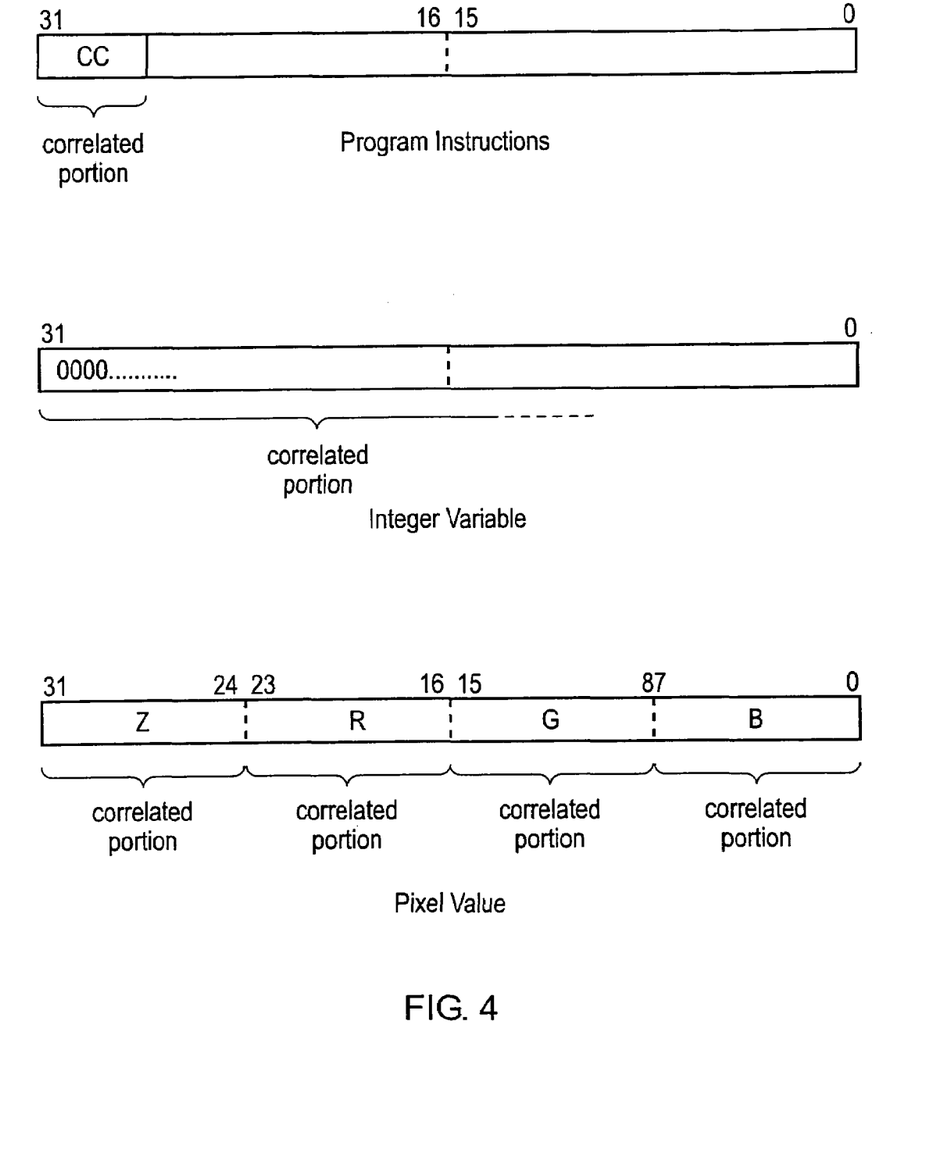
FIG. 4 schematically illustrates different types of 32-bit data words which may show significant degrees of bit-value correlation between successive data words that can be exploited by the present techniques.

FIG. 4 schematically illustrates three different types of data word which have bit value correlation in different portions that may be exploited by the present technique. The first example is a program instruction which includes a fixed field defining condition codes for the execution of the instruction. These condition codes typically are the same for long runs of program instructions and show a high degree of bit-value correlation between successive program instructions. Accordingly, when such program instructions are being transferred as data values (there being no distinction between instructions and data in the context of the transfers discussed herein) then that correlation can be exploited by appropriate reordering when bus resizing is performed such that the condition codes occur in the same place in successive transfers on the narrower bus.

The second example illustrated is an integer variable. It will be appreciated by those in this technical field that a large proportion of integer variables are small compared to their permitted maximum range and accordingly are typically prefaced by long runs of zeros or ones depending upon the sign convention used. Thus, the high order portion of such integer variables show a high degree of bit-value correlation and accordingly when multiple integer values of this type are transferred reordering to place these high order portions as successive transfers on the narrower bus will reduce the Hamming distance between those transfers and save power.

The final example in FIG. 4 is a pixel value. In this case, different portions of the 32-bit pixel value represent different components of the pixel concerned. These components are stored in the same place in each pixel value. It will be known to those in this field that there is a high degree of correlation between adjacent pixels within typical image data and accordingly there will be a high degree of correlation between respective portions of adjacent pixel values when these are successively transferred. This correlation can be maintained despite resizing by appropriate reordering such that in the case of a 32-bit to 16-bit size reduction all the green and blue portions were sent as successive transfers followed by all the Z and red components.

Figure 5:
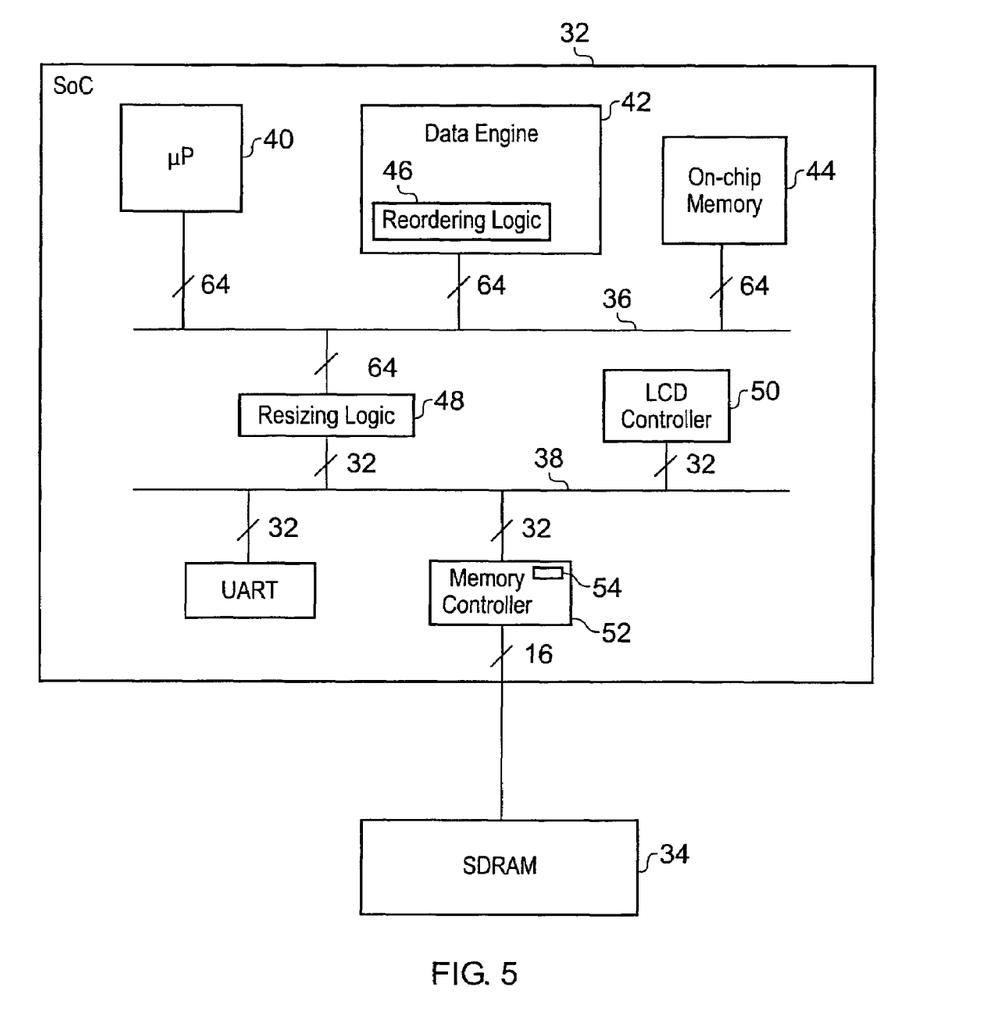
FIG. 5 schematically illustrates a system on-chip integrated circuit connected to an off-chip memory with data buses of differing widths upon the system-on-chip integrated circuit.

FIG. 5 illustrates a further example embodiment. In this case the system comprises a system-on-chip integrated circuit 32 coupled to an SDRAM memory 34. The system-on-chip integrated circuit 32 includes an on-chip 64-bit bus 36 and an on-chip 32-bit bus 38. A microprocessor 40, a data engine 42 and an on-chip memory 44 are coupled to the 64-bit bus 36. The data engine 42 may, for example, be a graphics engine manipulating pixel values with the type of highly bit-value correlated properties illustrated in FIG. 4 and accordingly well suited to use of the present technique by employing locally deployed reordering logic 46 within the data engine 42. This reordering logic 46 in conjunction with resizing logic 48 disposed between the 64-bit bus 36 and the 32-bit bus 38 serve to reorder 64-bit data transfers into 32-bit data transfers in which bit value correlation between successive 32-bit values is increased. An LCD (liquid crystal display) controller 50 coupled to the 32-bit bus 38 is a typical consumer of such pixel data. However, on occasion, pixel data is to be written out to the memory 34 via a memory controller 52. The memory 34 is coupled by a 16-bit bus to the memory controller 52. Power consumption on this 16-bit bus can be reduced by the memory controller 52 again reordering data values originating within the data engine 42 so that bit-correlated portions are transmitted on successive data transfers. A configuration register/block 54 within the memory controller 52 is set up to identify such pixel values being transferred by virtue of their memory address space characteristics and accordingly reorder them in a manner which is responsive to their original form when they comprised 64-bit data words on the 64-bit bus 36. Thus, a pixel value produced by the data engine 42 may be a 64-bit pixel value comprising four 16-bit components. These may be reordered when being transferred on the 32-bit bus 36 in a manner as discussed in relation to FIG. 4 with green and blue values being transmitted in one burst followed by Z and red values. When such data values are again to be transferred over the 16-bit bus out to the memory 34, then they may be further reordered such that they are placed into bursts where all the green values are together followed by all the blue values, red values and Z values. The original nature of the data values having this form can be flagged within the set up registers 54 of the memory controller 52. Thus, data being written to an area within the memory 34 known to correspond to pixel data can be subject this second level of reordering.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
   a first device;
   an N-bit data bus coupled to said first device and configured to transmit N-bit bus transactions;
   a second device;
   an M-bit data bus coupled to said second device and configured to transmit M-bit bus transactions, where M is less than N;
   bus resizing logic coupled to said N-bit data bus and to said M-bit data bus and configured to convert between an N-bit bus transaction upon said N-bit data bus and a plurality of M-bit bus transactions upon said M-bit data bus; and
   transmission reordering logic configured to reorder data within a sequence of N-bit data words being transmitted between said first device and said second device via said N-bit data bus, said bus resizing logic and said M-bit data bus, such that correlated portions of different N-bit data words are transferred using a common portion of temporally adjacent M-bit data words being transmitted via said M-bit data bus thereby reducing an average Hamming distance between successive M-bit data words transmitted via said M-bit data bus,
   wherein said correlated portions are portions of said different N-bit data words including a plurality of adjacent bits with the same position within a range extending from a least significant bit to a most significant bit of respective ones of said different N-bit data words.

2. Apparatus as claimed in claim 1, wherein
temporally adjacent N-bit data words to be transmitted each have at least one portion that is correlated between temporally adjacent N-bit data words; and
said transmission reordering logic reorders data within said temporally adjacent N-bit data words such that said at least one portion is transmitted using a common portion of temporally adjacent M-bit data words.

3. Apparatus as claimed in claim 1, wherein N=Z*M, where Z is a whole number greater than or equal to 2, and said transmission reordering logic reorders data from temporally adjacent N-bit data words to be transmitted such that correlated M-bit portions of Z different N-bit data words are transmitted via said M-bit data bus as Z temporally adjacent M-bit data words.

4. Apparatus as claimed in claim 1, wherein said transmission reordering logic is part of said bus resizing logic and is coupled to said first device via said N-bit data bus.

5. Apparatus as claimed in claim 1, wherein said transmission reordering logic is part of said first device and is coupled to said bus resizing logic via said N-bit data bus.

6. Apparatus as claimed in claim 1, wherein said second device is a memory.

7. Apparatus as claimed in claim 6, comprising a memory controller, said bus resizing logic and said transmission reordering logic being part of said memory controller.

8. Apparatus as claimed in claim 1, comprising:
a first address bus associated with said N-bit data bus for transmitting addresses of N-bit data values being transmitted via said N-bit data bus; and
a second address bus associated with said M-bit data bus for transmitting addresses of M-bit data values being transmitted via said M-bit data bus; wherein
at least one of said transmission reordering logic and said bus resizing logic maps between a sequence of adjacent addresses on said first address bus and a sequence of non-adjacent addresses on said second address bus.

9. Apparatus as claimed in claim 6, wherein
said sequence of N-bit data words are stored within said memory in a reordered form corresponding to said sequence of temporally adjacent M-bit data words; and
said bus resizing logic and said transmission reordering logic are configured to reverse said reordering upon reading said memory such that said sequence of temporally adjacent M-bit data words are reordered to form said sequence of N-bit data words.

10. Apparatus as claimed in claim 6, comprising:
a first address bus associated with said N-bit data bus for transmitting addresses of N-bit data values being transmitted via said N-bit data bus; and
a second address bus associated with said M-bit data bus for transmitting addresses of M-bit data values being transmitted via said M-bit data bus; wherein
at least one of said transmission reordering logic and said bus resizing logic maps between a sequence of adjacent addresses on said first address bus and a sequence of non-adjacent addresses on said second address bus.

11. Apparatus as claimed in claim 1, wherein a control signal passed between said first device and said transmission reordering logic specifies which portions of said N-bit data words are bit-value correlated.

12. Apparatus as claimed in claim 1, wherein a control signal passed between said second device and said transmission reordering logic specifies what re-ordering should be applied by said transmission reordering logic.

13. Apparatus as claimed in claim 6, wherein said memory is divided into at least one reordered memory address space portion for which said transmission reordering logic is active to perform said reordering and at least one non-reordered memory address space portion for which said transmission reordering logic is not active to perform said reordering.

14. Apparatus as claimed in claim 13, wherein said memory is divided into a plurality of reordered memory address space portions and at least two of said plurality of reordered memory address space portions are subject to a different type of reordering.

15. Apparatus as claimed in claim 1, wherein said first device is part of a first integrated circuit and said second device is part of a second integrated circuit.

16. Apparatus as claimed in claim 1, wherein said first device and said second device are both part of a common integrated circuit.

17. Apparatus as claimed in claim 16, wherein said M-bit data bus supports on-chip burst mode transactions to a sequence of non-adjacent memory addresses.

18. Apparatus as claimed in claim 1, wherein said N-bit bus transactions include N-bit burst mode bus transactions.

19. Apparatus as claimed in claim 1, wherein said M-bit bus transactions include M-bit burst mode bus transactions.

20. Apparatus for processing data, said apparatus comprising:
first device means;
an N-bit data bus coupled to said first device means and configured to transmit N-bit bus transactions;
second device means;
an M-bit data bus coupled to said second device and configured to transmit M-bit bus transactions, where M is less than N;
bus resizing means coupled to said N-bit data bus and to said M-bit data bus and for converting between an N-bit bus transaction upon said N-bit data bus and a plurality of M-bit bus transactions upon said M-bit data bus; and
transmission reordering logic for reordering data within a sequence of N-bit data words being transmitted between said first device means and said second device means via said N-bit data bus, said bus resizing means and said M-bit data bus, such that correlated portions of different N-bit data words are transferred using a common portion of temporally adjacent M-bit data words being transmitted via said M-bit data bus thereby reducing an average Hamming distance between successive M-bit data words transmitted via said M-bit data bus,
wherein said correlated portions are portions of said different N-bit data words including a plurality of adjacent bits with the same position within a range extending from a least significant bit to a most significant bit of respective ones of said different N-bit data words.

21. A method of processing data, said method comprising the steps of:
transmitting N-bit bus transactions via an N-bit data bus coupled to a first device;
transmitting M-bit bus transactions via an M-bit data bus coupled to a second device, where M is less than N;
converting between an N-bit bus transaction upon said N-bit data bus and a plurality of M-bit bus transactions upon said M-bit data bus; and
reordering data within a sequence of N-bit data words being transmitted between said first device and said second device via said N-bit data bus and said M-bit data bus, such that correlated portions of different N-bit data words are transferred using a common portion of temporally adjacent M-bit data words being transmitted via said M-bit data bus thereby reducing an average Hamming distance between successive M-bit data words transmitted via said M-bit data bus,
wherein said correlated portions are portions of said different N-bit data words including a plurality of adjacent bits with the same position within a range extending from a least significant bit to a most significant bit of respective ones of said different N-bit data words.

22. A method as claimed in claim 21, wherein
temporally adjacent N-bit data words to be transmitted each have at least one portion that is correlated between temporally adjacent N-bit data words; and
said reordering reorders data within said temporally adjacent N-bit data words such that said at least one portion is transmitted using a common portion of temporally adjacent M-bit data words.

23. A method as claimed in claim 21, wherein N=Z*M, where Z is a whole number greater than or equal to 2, and said reordering reorders data from temporally adjacent N-bit data words to be transmitted such that correlated M-bit portions of Z different N-bit data words are transmitted via said M-bit data bus as Z temporally adjacent M-bit data words.

24. A method as claimed in claim 21, wherein said second device is a memory.

25. A method as claimed in claim 24, wherein said resizing and said reordering are performed by a memory controller.

26. A method as claimed in claim 21, wherein:
a first address bus is associated with said N-bit data bus for transmitting addresses of N-bit data values being transmitted via said N-bit data bus;
a second address bus is associated with said M-bit data bus for transmitting addresses of M-bit data values being transmitted via said M-bit data bus; and
at least one of said reordering and said resizing maps between a sequence of adjacent addresses on said first address bus and a sequence of non-adjacent addresses on said second address bus.

27. A method as claimed in claim 24, wherein
said sequence of N-bit data words are stored within said memory in a reordered form corresponding to said sequence of temporally adjacent M-bit data words; and
said reordering is reversed upon reading said memory such that said sequence of temporally adjacent M-bit data words are reordered to form said sequence of N-bit data words.

28. A method as claimed in claim 24, wherein:
a first address bus is associated with said N-bit data bus for transmitting addresses of N-bit data values being transmitted via said N-bit data bus; and
a second address bus is associated with said M-bit data bus for transmitting addresses of M-bit data values being transmitted via said M-bit data bus;
at least one of said reordering and said resizing maps between a sequence of adjacent addresses on said first address bus and a sequence of non-adjacent addresses on said second address bus.

29. A method as claimed in claim 21, wherein a control signal from said first device specifies which portions of said N-bit data words are bit-value correlated.

30. A method as claimed in claim 21, wherein a control signal from said second device specifies what re-ordering should be applied.

31. A method as claimed in claim 24, wherein said memory is divided into at least one reordered memory address space portion for which said reordering is performed and at least one non-reordered memory address space portion for which said reordering is not active to performed.

32. A method as claimed in claim 31, wherein said memory is divided into a plurality of reordered memory address space portions and at least two of said plurality of reordered memory address space portions are subject to a different type of reordering.

33. A method as claimed in claim 21, wherein said first device is part of a first integrated circuit and said second device is part of a second integrated circuit.

34. A method as claimed in claim 21, wherein said first device and said second device are both part of a common integrated circuit.

35. A method as claimed in claim 34, wherein said M-bit data bus supports on-chip burst mode transactions to a sequence of non-adjacent memory addresses.

36. A method as claimed in claim 21, wherein said N-bit bus transactions include N-bit burst mode bus transactions.

37. A method as claimed in claim 21, wherein said M-bit bus transactions include M-bit burst mode bus transactions.

38. Apparatus for processing data, said apparatus comprising:
a first device;
an N-bit data bus coupled to said first device and configured to transmit N-bit bus transactions;
a second device;
an M-bit data bus coupled to said second device and configured to transmit M-bit bus transactions, where M is less than N;
bus resizing logic coupled to said N-bit data bus and to said M-bit data bus and configured to convert between an N-bit bus transaction upon said N-bit data bus and a plurality of M-bit bus transactions upon said M-bit data bus; and
transmission reordering logic configured to reorder data within a sequence of N-bit data words being transmitted between said first device and said second device via said N-bit data bus, said bus resizing logic and said M-bit data bus, such that correlated portions of different N-bit data words are transferred using a common portion of temporally adjacent M-bit data words being transmitted via said M-bit data bus thereby reducing an average Hamming distance between successive M-bit data words transmitted via said M-bit data bus, wherein:
said N-bit data words contain one or more data elements; and
said transmission reordering logic is responsive to the size of said data elements to determine what reordering should be applied by said transmission reordering logic.

39. A method of processing data, said method comprising the steps of:
transmitting N-bit bus transactions via an N-bit data bus coupled to a first device;
transmitting M-bit bus transactions via an M-bit data bus coupled to a second device, where M is less than N;
converting between an N-bit bus transaction upon said N-bit data bus and a plurality of M-bit bus transactions upon said M-bit data bus; and
reordering data within a sequence of N-bit data words being transmitted between said first device and said second device via said N-bit data bus and said M-bit data bus, such that correlated portions of different N-bit data words are transferred using a common portion of temporally adjacent M-bit data words being transmitted via said M-bit data bus thereby reducing an average Hamming distance between successive M-bit data words transmitted via said M-bit data bus, wherein:
said N-bit data words contain one or more data elements; and
said reordering applied depends upon the size of said data elements.

* * * * *